Figure 1:
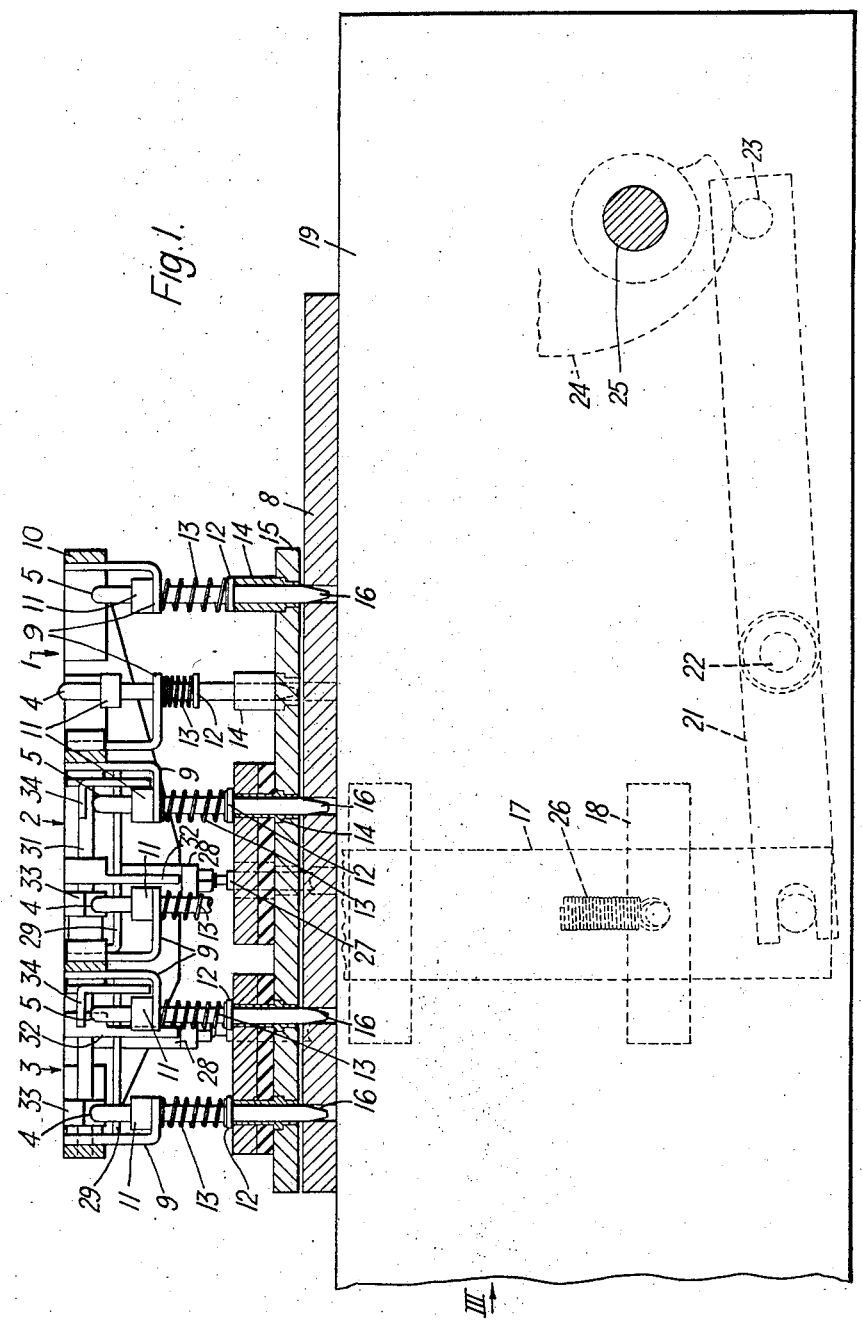

July 9, 1957 W. B. C. WATKIN 2,798,668
CARD-LOCATING APPARATUS
Filed May 8, 1956 3 Sheets-Sheet 1

Inventor
WILFRID B.C. WATKIN
By

July 9, 1957 W. B. C. WATKIN 2,798,668
CARD-LOCATING APPARATUS
Filed May 8, 1956 3 Sheets-Sheet 3

Inventor
WILFRID B. C. WATKIN
By

United States Patent Office 2,798,668
Patented July 9, 1957

2,798,668

CARD-LOCATING APPARATUS

Wilfrid Bateman Cook Watkin, Beckenham, England, assignor to Powers-Samas Accounting Machines Limited, London, England, a British company Application May 8, 1956, Serial No. 583,519

Claims priority, application Great Britain June 3, 1955

6 Claims. (Cl. 235—61.11)

This invention relates to apparatus for locating a record card in a stationary position for sensing thereof and for forming in the card a cut-out indicative of correct location of the card in said position.

When record cards are fed through statistical machines, it is sometimes desired to effect a checking operation in order to ensure that the card has been sensed or that it has been sensed correctly. Usually this is effected at a sensing stage following that at which the sensing is first effected and such checking necessitates the provision of additional sensing means for effecting checking and, should sensing be effected in two or more stages, then a check sensing mechanism must be provided for each of the sensing stages.

It is a main object of the present invention to provide apparatus for locating a record card in a stationary position for sensing thereof and to provide means which cooperate with the card-locating means thereby to form in a card a cut-out which is indicative of the fact that the card has been correctly located for sensing. By this means, it is possible to give an indication, on delivery of the cards from the machine, to the effect that any particular card has been incorrectly located at the sensing position and it can be assumed that, if the card has not been correctly located, then the sensing cannot have been correctly performed. The apparatus does not, of course, ensure that the sensing has been accurately performed as this must be a function of the sensing apparatus, but usually if the card is correctly positioned for sensing then the sensing will be correctly performed.

It is a further object of the invention to provide apparatus which will locate and check the location of two or more cards simultaneously in position for sensing by two different sensing devices, and the apparatus is of particular value for locating record cards having very small data perforations formed therein, the cards being presented to sensing devices which sense the small hole perforations and transmit signals to a reproducing machine in which the data patterns are reproduced on cards of normal size for use in statistical machines, such as sorting or tabulating machines.

According to the invention there is provided apparatus for locating a record card in a stationary position for sensing thereof and for forming in the card a cut-out indicative of correct location of the card in said position, comprising a frame supported for movement towards and away from a card disposed substantially in the position of sensing thereof, aligning pins supported by the frame for movement therewith and independent lengthwise movement relative thereto in the event that during movement of the frame towards a card a pin is engaged by an imperforate area of the card, a punch supported by the frame for movement therewith and lengthwise relative thereto, and punch-conditioning means connected with said aligning pins normally to condition the punch to form a cut-out in a card on passage of each of the aligning pins through the card and rendered ineffective by any one of the aligning pins being engaged with an imperforate area of a card.

Figure 2:
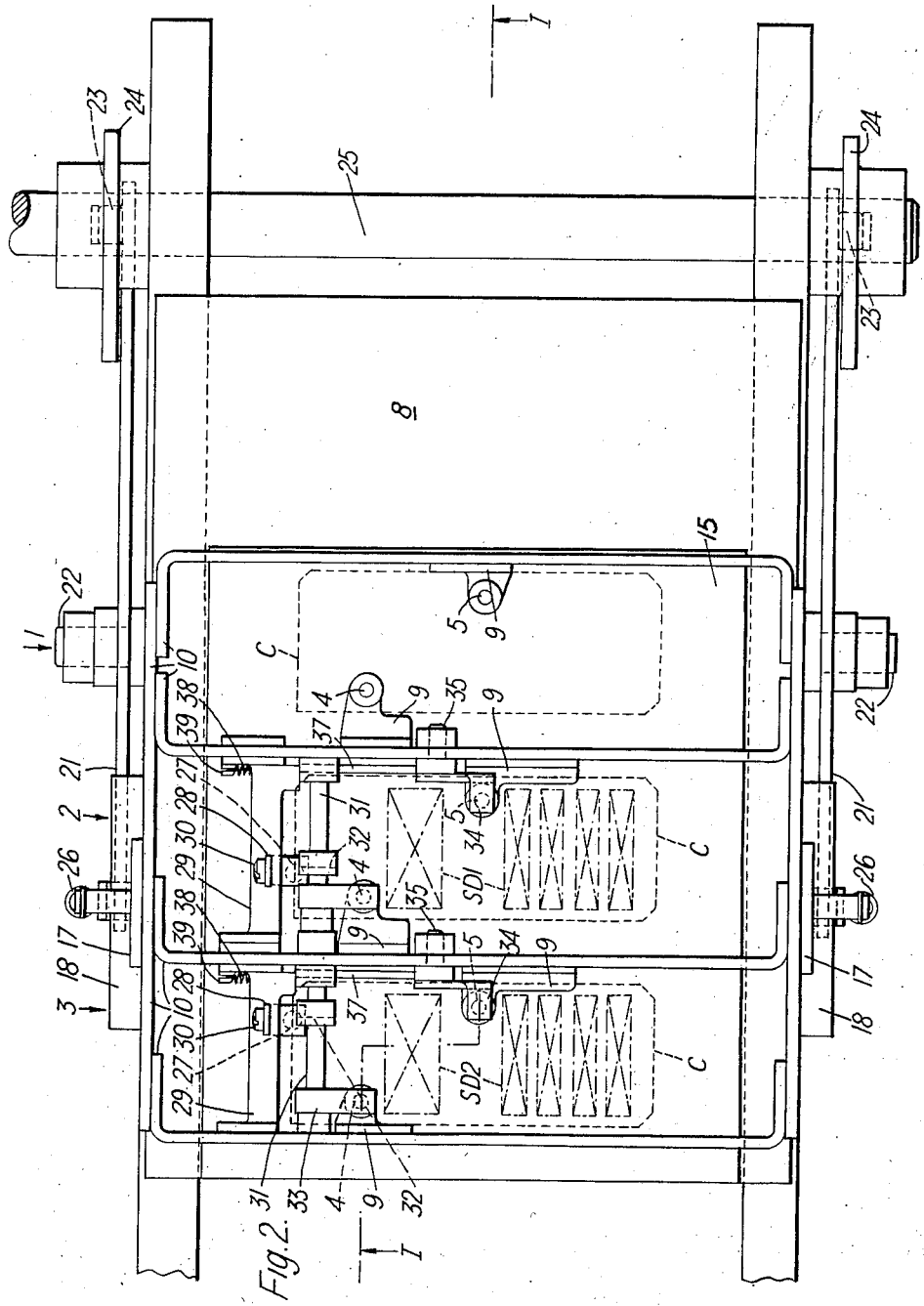
Figure 3:
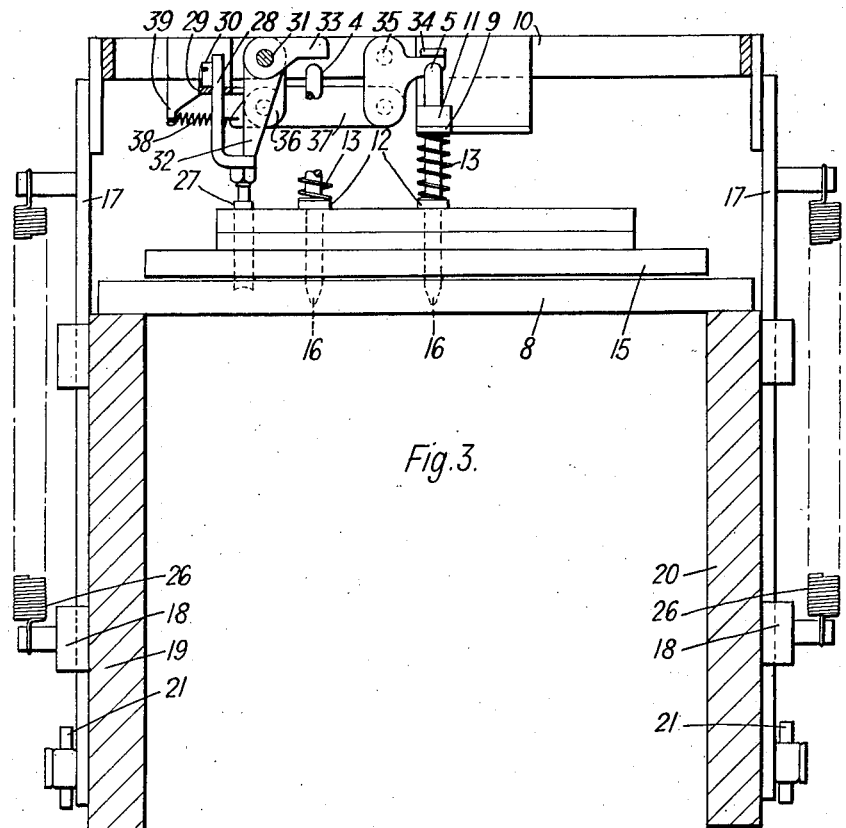
Figure 4:
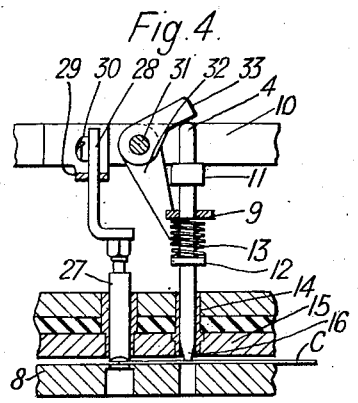
Figure 5:
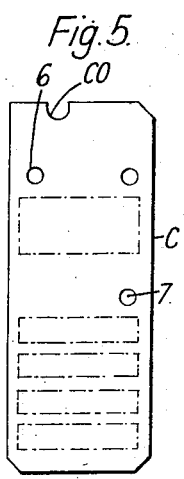
Figure 6:
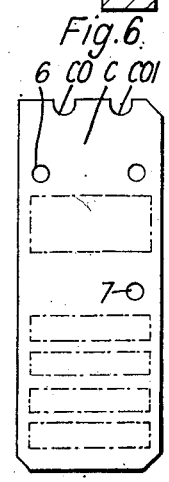

In order that the invention may be clearly understood, one embodiment thereof will now be described, by way of example, with reference to the accompanying drawings, in which:

Figure 1 is an elevation, partly in section on line I—I, Figure 2, of apparatus according to the invention, Figure 2 is a top plan of Figure 1, Figure 3 is a view looking in the direction of arrow III, Figure 1, Figure 4 shows a part of the mechanism shown in Figure 3, the elements therein being shown in positions different from those shown in Figure 3, Figure 5 illustrates a card which has been properly located for sensing and has a single cut-out formed therein, and Figure 6 is a view similar to that of Figure 5, but shows a card after it has been properly located for sensing in a second sensing position and has had formed in it a second cut-out indicative of correct location for sensing.

Referring to the drawings, cards C to be sensed are fed one at a time from the bottom of a magazine, not shown, and are delivered in succession to three stations 1, 2 and 3. A card, on being delivered from the magazine to station 1 is subjected to a first locating operation at which pins 4 and 5, to be described in greater detail below, cooperate with locating holes 6, 7, Figures 5 and 6, formed in the card. From station 1 the card is moved in successive steps first to station 2 and then to station 3 at each of which stations it is positioned for a sensing operation by sensing apparatus, not shown and forming no part of the present invention, but which is diagrammatically indicated in Figure 2 by the references SD1, SD2. The cards may be advanced from the magazine and to and from stations 1, 2 and 3 by any suitable form of card-advancing mechanism, but preferably by a device, not shown, which includes pusher elements arranged to project through slots formed in a top plate 8, the pusher elements being supported by reciprocable bars supported for reciprocation beneath the top plate 8.

At each of the stations 1, 2 and 3 there are provided aligning pins 4 and 5 each of which is supported by a bracket 9 secured to a frame 10. Each aligning pin is provided with a shoulder 11 arranged normally to abut against the bracket 9 and with a further shoulder 12 between which and the inside of the bracket 9, extends a light spring 13. The aligning pins are therefore supported by the frame 10 for movement therewith and for lengthwise movement relative thereto against the action of their light springs 13. The lower ends of the aligning pins extend into bushes 14 secured to a plate 15 which is supported above the plate 8 and is spaced therefrom to permit the passage of cards between the plates 8 and 15. If, when a card is disposed at a station, it is not correctly aligned when, on downward movement of the frame 10, should the card be only slightly displaced from the correct location thereof, the tapered ends 16 of the aligning pins will enter the locating holes 6 and 7 and will draw the card into the correct location thereof since the aligning pins, above the tapered ends thereof, are only very slightly smaller in diameter than the holes 6 and 7. If, however, the card should be so far out of correct location that the tapered end 16 of one of the pins cannot enter a perforation, and so engages an imperforate area of the card, during the continued downward movement of the frame 10, the aligning pin engaged by the imperforate card area will move lengthwise relative to the frame against the action of its light spring 13, as illustrated in Figure 4.

The frame 10 is supported for movement towards and away from the plate 8 by support bars 17 disposed at the opposite sides of the machine and guided for vertical movement by bearings 18 secured to the side frames 19, 20 of the machine by which the plate 8 is supported. To the lower end of each of the support bars 17 is connected an arm 21 pivoted at 22 to the machine frames, the arms 21 each carrying a cam follower 23 for co-operation with a cam 24 secured on a rotatable drive shaft 25. Springs 26 maintain engagement of the followers 23 with cams 24.

At each of the stations 2 and 3 at which sensing is to be effected there is provided a punch 27. The punch depends from a guide bar 28 supported by a guide bracket 29 secured to the frame 10. The guide bar 28 is slidable lengthwise in the bracket 29 and a screw 30 determines the extent of downward movement of the guide bar and punch relative to the frame 10. Journalled in the frame 10 are rocking spindles 31, one for each sensing station, and to each spindle 31 is secured a latch 32, one for each of the punches 27. The latches 32 normally co-operate with guide bars 28 in the manner illustrated in Figure 3, thereby to retain the punch rigid with respect to the frame 10 so that, on downward movement of the frame, the punch will pass through a card C that is properly located for sensing and will form in an edge thereof a cut-out CO, Figure 5. Also secured to the rocking spindles 31 for angular movement therewith is a tappet 33 which is located above the aligning pin nearest the rocking spindle, as shown in Figure 3. There is also provided for the aligning pin which is more distant from the rocking spindle a tappet 34 which, as can be seen in Figure 3, is located above the aligning pin with which it co-operates. The tappet 34 is pivoted at 35 to the frame 10 and is connected with the rocking spindle 31 through the medium of a lever 36, Figure 3, secured to the rocking spindle for angular movement therewith and by a connecting link 37 which connects the lever 36 with the tappet 34. A spring 38 is attached to the connecting link 37 and to an anchor plate 39 carried by the frame 10 and retains the latch 32 and tappets 33, 34 in the positions thereof shown in Figure 3.

If on downward movement of the frame 10 any of the aligning pins 4, 5 provided at stations 2 and 3 should encounter an imperforate card area, such pin will, as described above, move relatively to the frame 10, which will continue its downward movement, and due to this relative movement between the frame 10 and pins 4, 5 the tappet 33 or 34 appropriated to the impeded aligning pin will be rocked counter-clockwise, as viewed in Figures 3 and 4, thereby effecting rocking of spindle 31 to move the latch 32 to the position thereof illustrated in Figure 4 and in which it is disengaged from its punch 27 thereby to render the punch ineffective to form a cut-out CO in the card at that time at the sensing station.

From the foregoing it will be understood that with the apparatus described above the frame 10 supports for simultaneous operation two sets of aligning pins, punches, and punch-conditioning means, the sets being disposed for operation at each sensing station at each of which a card is sensed during successive operations of the frame. By this arrangement a card properly located at station 2 has formed therein a cut-out CO, as shown in Figure 5, and after sensing is moved to station 3 where, if it is properly located, it will have formed therein a second cut-out CO1, as shown in Figure 6. It will, of course, be understood that, if necessary, more than two sensing stations can be provided and, in such circumstances, correspondingly greater number of sets of aligning pins, punches and punch-conditioning means will be carried by the frame so that, if a card is properly located at each of the successive sensing stations, it will have an increasingly greater number of cut-outs formed therein.

When the cards are advanced from station 3 they are delivered into a stacker or receiver, not shown, and, on removal therefrom, it will be readily apparent if any of the cards has not been properly located at any of the sensing stations because, in such instance, the cut-out portions will not extend throughout the length of the pack removed from the receiver but will be interrupted by a card which has not been cut-out by a punch 27, Figure 6. As illustrated in Figures 5 and 6, the cut-outs are shown as substantially of semi-circular form located along an edge of the card, but in some circumstances it may not be possible for the cut-out to be formed along the edge of the card and in such circumstances the cut-out will consist of a perforation formed through the body of the card. There will, however, be no difficulty in ascertaining whether a card in a pack taken from the receiver has not had a perforation formed therein, because the perforations in the pile will be aligned with each other and by holding the pile up to the light it will be possible to see completely through the pile if all of the cards comprising the pile have been properly located at all the sensing stations. In the event that any card has not been properly located at one of the sensing stations, then the free passage through the pile will be obturated by the imperforate area of the card which has not been properly located for sensing. Alternatively, the cut-outs in the pack of cards may be tested by attempting to pass a rod through the aligned cut-out holes and the presence in the pack of any card not provided with the appropriate cut-out will be indicated by the rod being arrested by such card.

I claim:

1. Apparatus for locating a record card, having preformed locating holes, in a stationary position for sensing thereof and for forming in the card a cut-out indicative of correct location of the card in said position, comprising a frame supported for movement towards and away from a card disposed substantially in the position of sensing thereof, aligning pins supported by the frame for movement therewith to pass through the locating holes in the card when the card is properly positioned and independent lengthwise movement relative thereto in the event that during movement of the frame towards a card a pin is engaged by an imperforate area of the card, a punch supported by the frame for movement therewith and lengthwise relative thereto, and punch-conditioning means connected with said aligning pins normally to condition the punch to form a cut-out in a card on passage of each of the aligning pins through the card locating holes and rendered ineffective by any one of the aligning pins being engaged with an imperforate area of a card.

2. Apparatus according to claim 1, wherein the frame supports for simultaneous operation at least two sets of aligning pins, punches, and punch-conditioning means, said sets being disposed for operation at different sensing stations at each of which a card is sensed during successive operations of the frame.

3. Apparatus according to claim 1, wherein the punch-conditioning means comprises a rocking spindle journalled in said frame, a latch secured to said spindle for angular movement therewith and normally effecting rigid connection between the punch and the frame, and tappets connecting the rocking spindle with the aligning pins and operable on lengthwise movement of an aligning pin relative to the frame to effect rocking of said spindle thereby to disengage the latch from the punch to permit lengthwise movement of the punch relative to the frame so that no cut-out is formed in a card by the punch.

4. Apparatus according to claim 3, wherein one aligning pin is supported by the frame to be more distant from the rocking spindle than another of the aligning pins and the tappet for the more distant pin is pivoted on said frame and is connected with the rocking spindle by a lever secured to the spindle and a connecting link connecting the lever to the pivoted tappet.

5. Apparatus according to claim 2, wherein the punch-conditioning means of each said set comprises a rocking spindle journalled in said frame, a latch secured to said spindle for angular movement therewith and normally effecting rigid connection between the punch and the frame, and tappets connecting the rocking spindle with the aligning pins and operable on lengthwise movement of an aligning pin relative to the frame to effect rocking of said spindle thereby to disengage the latch from the punch to permit lengthwise movement of the punch relative to the frame so that no cut-out is formed in a card by the punch.

6. Apparatus according to claim 5, wherein one aligning pin is supported by the frame to be more distant from the rocking spindle than another of the aligning pins and the tappet for the more distant pin is pivoted on said frame and is connected with the rocking spindle by a lever secured to the spindle and a connecting link connecting the lever to the pivoted tappet.

No references cited.